United States Patent

[11] 3,613,976

[72] Inventors Michael Carl Guerrero; Robert Earl Justice; Richard Miller Rudy, all of Palm Beach Gardens, Fla.

[21] Appl. No. 12,618
[22] Filed Feb. 19, 1970
[45] Patented Oct. 19, 1971
[73] Assignee RCA Corporation

[54] APPARATUS FOR HANDLING ENDLESS TAPE
7 Claims, 4 Drawing Figs.

[52] U.S. Cl. .......... 226/78, 226/118, 352/78
[51] Int. Cl. .......... G11b 23/06
[50] Field of Search .......... 226/118, 78, 119; 179/100.2 Z; 352/126, 127, 78

[56] References Cited

UNITED STATES PATENTS

| | | | |
|---|---|---|---|
| 2,238,719 | 4/1941 | De Tartas .......... | 352/126 |
| 3,021,989 | 2/1962 | Sellers .......... | 226/118 |

*Primary Examiner*—Allen N. Knowles
*Attorney*—H. Christoffersen

ABSTRACT: A relatively long endless tape is loosely stored in a relatively small container as a stack of loops lying one over another. One additional loop leading to opposite ends of the stack extends from the container. In use, the loop extending from the container is threaded over a drive roller which pulls the tape off one end of the stack and past a transducer. One portion of the pulled tape engages and drives an idler mechanism. The latter, in turn, engages another portion of the tape and drives the tape back into the container at the other end of the stack.

PATENTED OCT 19 1971

3,513,976

SHEET 1 OF 3

INVENTORS.
MICHAEL C. GUERRERO,
ROBERT E. JUSTICE and
RICHARD M. RUDY
BY H. Christoffersen
ATTORNEY INVENTORS.
MICHAEL C. GUERRERO,
ROBERT E. JUSTICE and
RICHARD M. RUDY.
BY H. Christoffersen
ATTORNEY INVENTORS
MICHAEL C. GUERRERO,
ROBERT E. JUSTICE and
RICHARD M. RUDY.
BY H. Christoffersen
ATTORNEY

APPARATUS FOR HANDLING ENDLESS TAPE

BACKGROUND OF THE INVENTION

In the data processing field, paper tape processing equipment is often used. Much of the paper tape equipment has no special provisions for handling the tape which is not in the vicinity of the reading device. Often the tape has no containing means and as a result, the tape falls freely from the apparatus. This may be satisfactory if the length of the tape is short and if there is no mechanism with moving parts near by in which the tape could get caught. However, as the length of the tape to be read increases, there is the danger of it being accidentally stepped on and damaged by the data processing operator. Further, if there is an exposed moving mechanism in the area, there is the danger of the tape becoming tangled in the mechanism and possibly torn.

One solution to the problem is to add tape reels to hold the tape. These reels have to be powered in some way, either by being coupled to the paper tape drive mechanism or by being powered by separate motors. The first method generally is not practical if the mechanism is not designed for operation in this way and the latter method may be very costly.

It is an object of the present invention to provide a low-cost tape storage and handling device which does not require powered connection to the tape reader.

SUMMARY OF THE INVENTION

An apparatus for handling an endless tape includes a container for storing the greater portion of the tape and is formed with opening means through which the remaining part of the tape extends. A drive means engages a portion of the remaining part of the tape to pull it from the container. An idler means is driven by the tape and in turn drives the tape through the opening means and back into the container.

DETAILED DESCRIPTION

Figure 1:
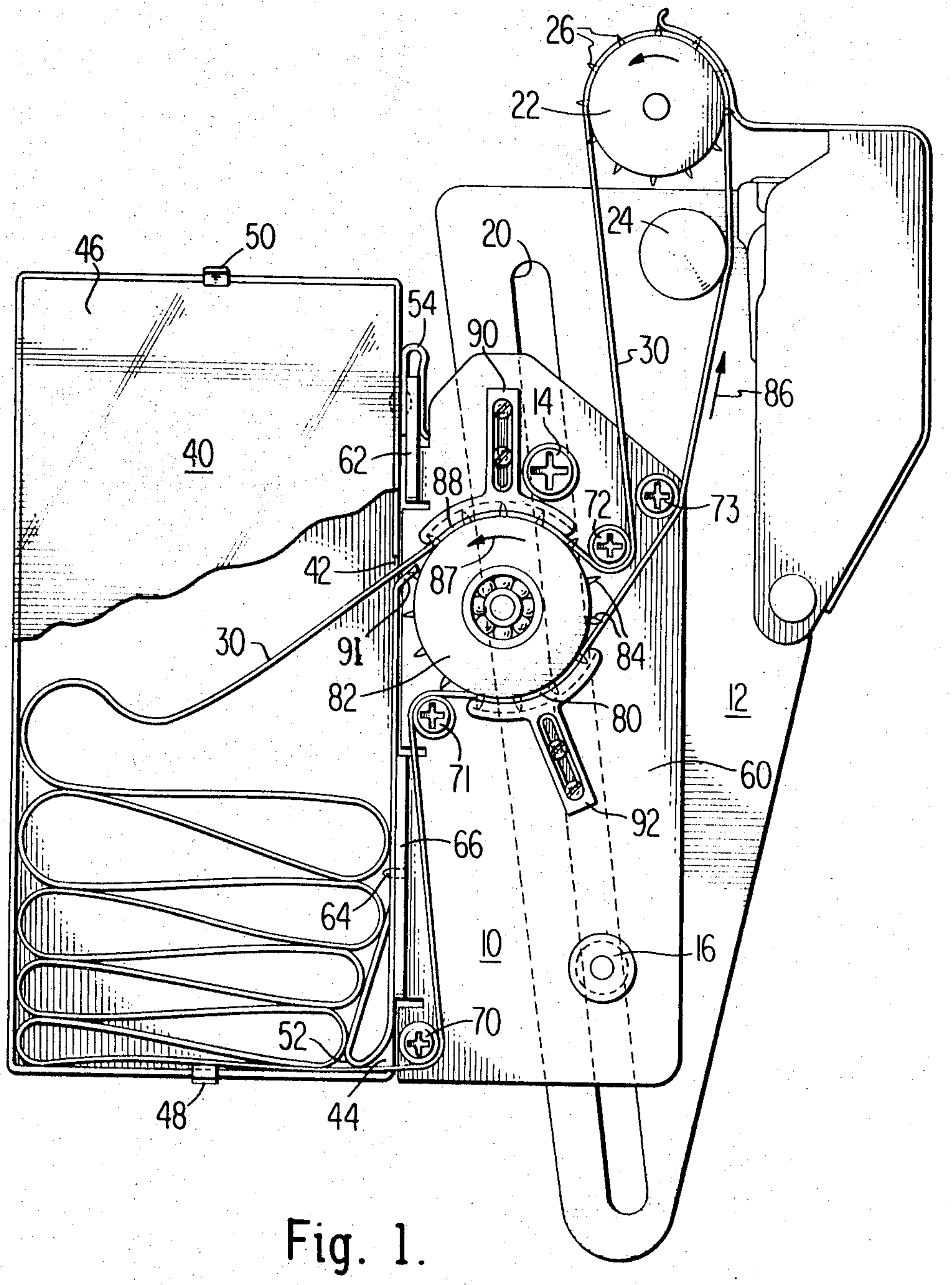
FIG. 1 is a front view of one embodiment of the invention.

In FIGURE 1 the present invention is shown comprising two parts; one, a tape storage container or "cassette" 40 and two, a tape guiding and tape operated driving means 10. In practice, the customer is supplied with one mechanism 10 and several cassettes each containing a different tape. The cassette 40 and mechanism 10 are removably attached to a conventional paper tape reader 12 by fasteners 14 and 16. The fasteners 14 and 16 are located in an elongated slot 20 in the reader, which permits vertical adjustment of the apparatus relative to the reader.

Figure 2:
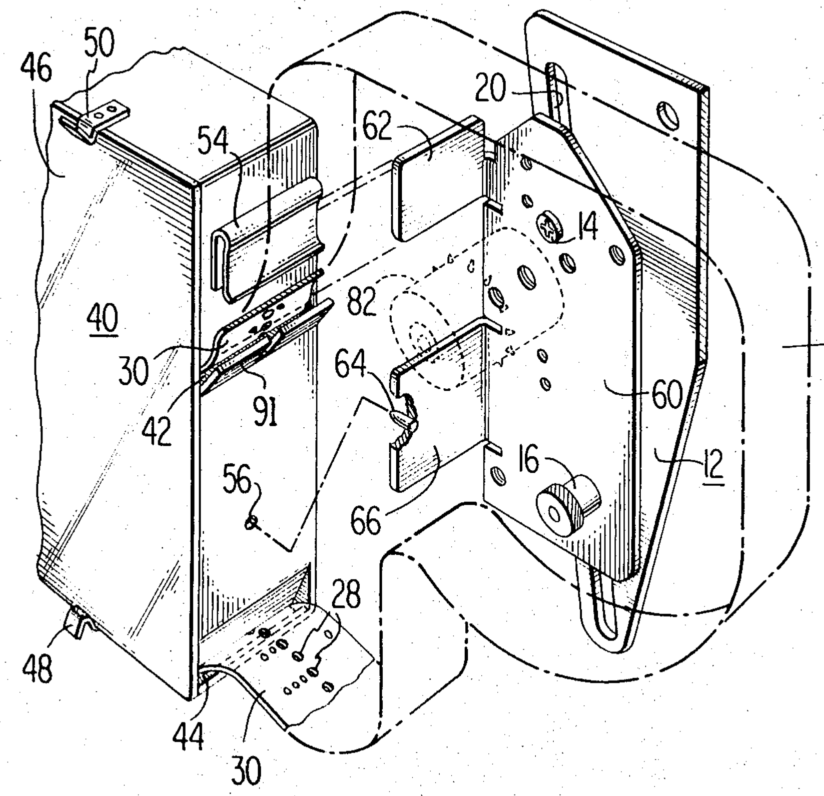
FIG. 2 is a perspective of a portion of the mechanism showing the method of mounting the tape cassette.

The reader 12 comprises a cylindrical drive means 22 and a read station 24. The drive means 22 has sprocket teeth 26 on its periphery which engage corresponding apertures 28 (FIGURE 2) on endless paper tape loop 30. The paper tape 30 passes over the drive means and is driven thereby.

The greater portion of the paper tape 30 is stored as a stack of loops in a cassette 40 which forms a part of mechanism 10. The cassette is a rectangular boxlike structure having openings 42 and 44 leading to opposite ends of the stack of loops and through which a portion of the tape projects. A transparent cover 46 is held to the cassette 40 by spring clips 48 and 50 to provide easy viewing of and access to the tape.

A projecting member 52, just above the lower opening 44, serves to prevent jamming of the tape against the opening through which the tape exists.

A spring clip 54 (best seen in FIG. 2) is mounted on the cassette and serves to removably secure the cassette in place on base 60. The clip 54 grips a projection 62 on the base. A locating pin 64 on a second projection 66 on the base 60 fits into an opening 56 (FIG. 2) in the cassette thereby positively positioning the cassette to the base.

Four cylindrical guide pins 70–73 fixed to base 60 are positioned so as to guide the portion of the tape located between the cassette and drive means 22.

A first portion 80 of the tape engages an idler means such as cylindrical idler roller 82 which is rotatably mounted on base 60 and which has its axis of rotation in a direction normal to the base. Aperatures 28 on the tape are engaged by sprocket teeth 84 affixed to roller 82. As the tape is propelled in the direction of arrow 86 by drive means 22, idler roller 82 is caused to rotate in the direction of arrow 87. A second portion 88 of the tape is also engaged by roller 82 causing the tape to be pushed back into the cassette through opening 42 in the cassette. A small projection 91 located on the cassette near opening 42 is so positioned to act as a "stripper" to strip the tape from sprocket pins 84.

Figure 3:
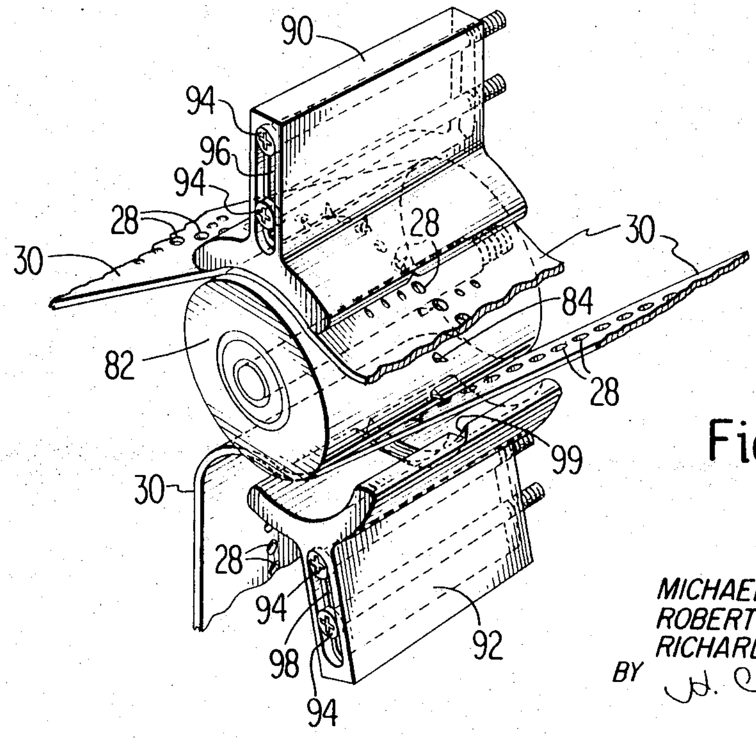
FIG. 3 is a perspective showing a portion of the mechanism for clamping the tape to the drive roller.

The tape is held against idler roller 82 by two T-shaped clamps 90, 92 (best seen in FIG. 3) which are slidably mounted to base 60. Fasteners such as screws 94 cause the clamps to be in frictional engagement with base 60. Slots 96 and 98 in clamps 90 and 92 respectively permit movement of the clamps in directions normal to the axis of rotation of roller 82. In FIG. 3, clamp 92 is shown open to permit tape insertion, and clamp 90 is shown in the closed position holding the tape against the roller. A V-shaped slot 99 in each clamp provides a clearance for sprocket pins 84.

In operation, the mechanism 10 is first installed on paper tape reader 12 using fasteners 14 and 16. Next, a cassette 40 containing the desired tape is selected, and a length of tape is pulled from the cassette through openings 42 and 44 in the cassette. Then the cassette 40 is installed on the mechanism 10. Finally, the portion of tape extending from the cassette is threaded into mechanism 10 over the drive roller 22 and through the read station 24 of the paper tape reader 12, as shown in FIG. 1. The clamps 90 and 92 are then closed against the tape. Due to the finite spacing between adjacent apertures 28 on the tape, there may be some slack in the tape after it has been threaded around idler roller 82. Excess slack may be removed by slightly loosening fasteners 14 and 16 and adjusting mechanism 10 up or down as needed to eliminate the unwanted tape slack.

As drive means 22 moves the tape in the direction of arrow 86, the tape is pulled from the lower end of the stack of loops in the cassette through opening 44. The moving tape causes the tape that has been read to be driven back into the cassette and onto the top of the stack of loops through opening 42 in the cassette.

Figure 4:
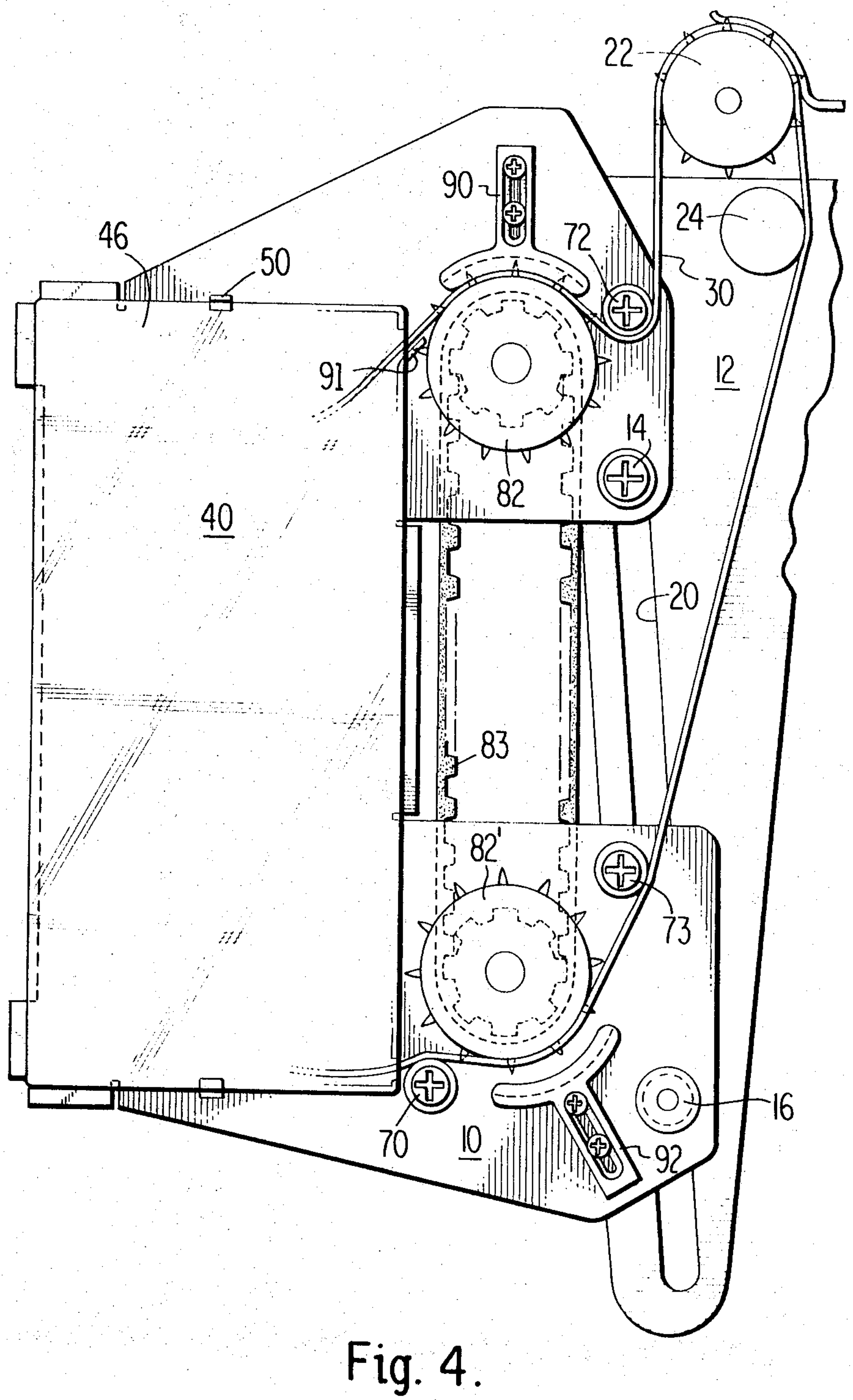
FIG. 4 is a front view of an alternate embodiment of the invention.

Although the mechanism shown is designed primarily for operation of the tape in one direction only, movement of the tape in the opposite direction may easily be accomplished by providing an idler means which includes a second roller 82′ similar to idler roller 82, located in proximity to opening 44 in the cassette as illustrated in FIG. 4. The two idler rollers are connected by a suitable means, such as a timing belt 83. Tape in the vicinity of opening 44 is in engagement with idler roller 82′ rather than with idler roller 82 as shown in FIG. 1. In such an arrangement, the tape may be moved in a direction of or opposite to that of arrow 86. In the latter direction it is pulled from opening 42 causing clockwise movement of roller 82. This motion is transmitted via timing belt 83 to idler roller 82′ which causes the tape to be pushed back into the cassette through opening 44 in the cassette. Although the tape has been described as a paper tape, it may well be made of other materials such as magnetic tape, photographic film or an inked ribbon.

What is claimed is:

1. Apparatus for handling an endless tape comprising, in combination:

a container for storing the greater portion of said tape and having opening means through which the remaining portion of said tape extends to the outside of said storage means;

drive means engaging one portion of said remaining part of said tape for pulling said tape from said container through said opening means; and idler means engagingly driven by a first portion of said tape as said tape is driven by said drive means, said idler means also engaging a second portion of said tape for returning said tape into said container as said drive means pulls tape from said container.

2. In combination:

an endless tape;

a container enclosing the greater portion of said tape for storing the same, and formed with opening means through which the remaining part of said tape extends to the outside of said container;

drive means engaging one portion of said remaining part of said tape for pulling said tape from said container through said opening means; and idler means engaging said remaining part of said tape in two places, one at which its is driven by the tape, and another at which it drives the tape back through said opening means and again into said container.

3. The combination as set forth in claim 2, wherein said container holds said tape as a stack of loops and wherein said opening means comprises two openings through which said remaining tape extends outside said container.

4. The combination as set forth in claim 3, wherein said idler means comprises a single idler roller located in proximity to the opening through which said tape is driven back into said container.

5. Apparatus for handling an endless tape comprising, in combination:

a tape station comprising a drive means;

an idler means removably attached to said tape station; and a container holding the greater portion of said tape and having opening means through which the remaining portion of said tape extends, said remaining portion being engaged by said drive means to be pulled from said container opening means, said remaining portion also being engaged by said idler means at two locations, one at which it is driven by said tape as said tape is driven by said drive means and one at which it drives said tape back into said opening means in said container.

6. Apparatus for handling an endless tape comprising in combination:

a container holding the greater portion of said tape as a stack of loops and having first and second openings, one at each end of the stack of loops, through which one additional loop extends from said container;

drive means engaging said one additional loop for pulling said tape from said first opening; and an idler roller in proximity to said second opening engaging a first portion of said additional loop located between said first opening and said drive means to be driven thereby and including a second portion of said one additional loop located between said drive means and said second opening to drive said tape back into said container through said second opening.

7. Apparatus for handling an endless tape for use with a tape station drive mechanism comprising, in combination:

a container for storing the greater portion of said tape and having opening means through which the remaining portion of said tape extends to the outside of said storage means;

one portion of said remaining part of said tape being engaged by said drive means for pulling said tape from said container through said opening means; and idler means coupled to said tape station drive means and engagingly driven by a first portion of said tape as said tape is driven by said drive means, said idler means also engaging a second portion of said tape for returning said tape into said container as said drive means pulls tape from said container.